(12) United States Patent
Herman et al.

(10) Patent No.: US 10,762,714 B2
(45) Date of Patent: Sep. 1, 2020

(54) METHOD AND SYSTEM FOR CALIBRATING A VIRTUAL REALITY SYSTEM

(71) Applicant: DreamWorks Animation L.L.C., Universal City, CA (US)

(72) Inventors: Brad Kenneth Herman, Culver City, CA (US); St. John Colón, Los Angeles, CA (US)

(73) Assignee: DREAMWORKS ANIMATION LLC, Glendale, CA (US)

( * ) Notice: Subject to any disclaimer, the term of this patent is extended or adjusted under 35 U.S.C. 154(b) by 0 days.

(21) Appl. No.: 16/226,437

(22) Filed: Dec. 19, 2018

(65) Prior Publication Data

US 2019/0156584 A1  May 23, 2019

Related U.S. Application Data

(63) Continuation of application No. 15/157,326, filed on May 17, 2016, now Pat. No. 10,176,638.

(Continued)

(51) Int. Cl.
*G06T 19/00* (2011.01)
*G06T 13/20* (2011.01)
(Continued)

(52) U.S. Cl.
CPC .......... *G06T 19/006* (2013.01); *G02B 27/017* (2013.01); *G06F 3/012* (2013.01); *G06F 3/04815* (2013.01); *G06T 13/20* (2013.01); *G06T 15/20* (2013.01); *G02B 2027/014* (2013.01); *G02B 2027/0138* (2013.01); *G02B 2027/0187* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 10,112,118 B2 * | 10/2018 | Davis | A63G 31/00 |
| 2015/0097860 A1 * | 4/2015 | Alaniz | G06F 3/011 345/633 |
| 2015/0269780 A1 * | 9/2015 | Herman | A63F 13/26 345/633 |

OTHER PUBLICATIONS

Caudell et al. "Augmented Reality: An application of Heads-Up Display Technology to Manual Manufacturing Processes", vol. ii, 1992, pp. 659-664. (Year: 1992).*

* cited by examiner

*Primary Examiner* — Michelle Chin
(74) *Attorney, Agent, or Firm* — Fletcher Yoder, P.C.

(57) ABSTRACT

A virtual reality system includes a platform, a headset, a mount, and a control unit. The headset includes a motion-sensing unit and a display unit configured to display a video of a virtual environment. The mount is positioned on the platform and configured to releasably engage the headset. While the headset is engaged with the mount, the headset is positioned in a first position. While the headset is disengaged from the mount, the headset is positioned in a second position. The control unit is connected to the headset and configured to receive first data representing the first position and associate the first position with a predetermined first perspective of the virtual environment. The control unit is also configured to receive second data representing the second position, determine a second perspective of the virtual environment corresponding to the second position, and provide video of the virtual environment from the second perspective.

21 Claims, 11 Drawing Sheets

Related U.S. Application Data

(60) Provisional application No. 62/163,313, filed on May 18, 2015.

(51) Int. Cl.
*G06T 15/20* (2011.01)
*G06F 3/0481* (2013.01)
*G06F 3/01* (2006.01)
*G02B 27/01* (2006.01)

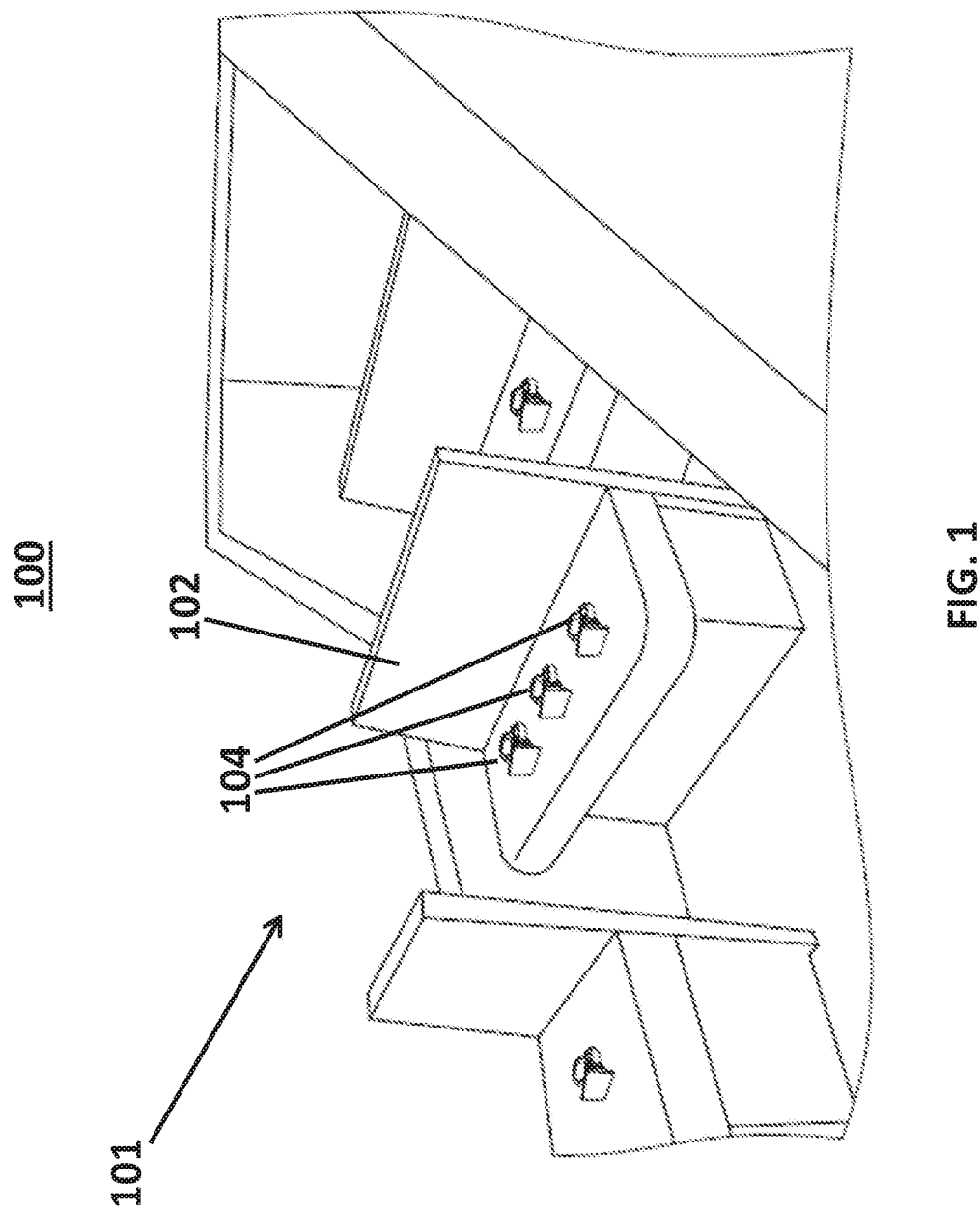

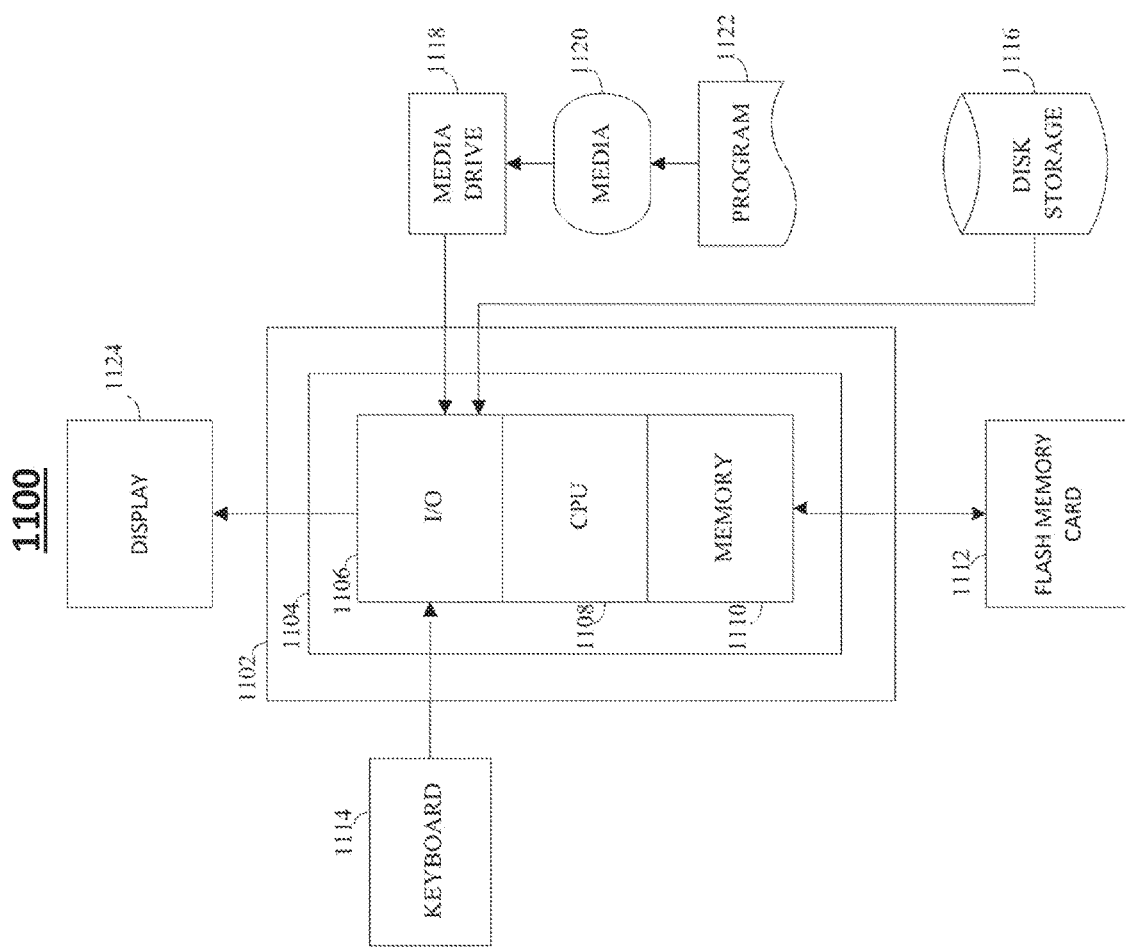

METHOD AND SYSTEM FOR CALIBRATING A VIRTUAL REALITY SYSTEM

CROSS-REFERENCE TO RELATED APPLICATIONS

This application is a continuation of U.S. patent application Ser. No. 15/157,326 filed May 17, 2016, which claims priority to U.S. Provisional Application Ser. No. 62/163,313 filed May 18, 2015. All of these applications are incorporated by reference herein in their entirety.

BACKGROUND

1. Field

This application relates generally to video-based virtual reality systems and, more specifically, to systems and methods for aligning a virtual reality headset to calibrate a virtual reality system.

2. Description of the Related Art

Virtual reality is a computer-simulated environment that can simulate a user's physical presence in real or imaginary environments. Applications of virtual reality include medical, gaming, and military environments. A virtual reality environment typically includes visual images displayed on a computer screen or through a stereoscopic (e.g., 3D) display. For example, video may be displayed on a wearable headset that provides an immersive virtual experience.

In some virtual reality applications, a user may change the displayed perspective of the virtual environment through the use of a keyboard, mouse, joystick, or other input device. In addition to or instead of such conventional input devices, a wearable headset may incorporate motion and/or orientation sensors that detect the position of the headset. The orientation of the headset may correspond to a particular look direction in the virtual environment, thus allowing a user to change the displayed perspective of the virtual environment by moving his/her head the same way he/she would look around the real world.

In some cases, it is desirable for the virtual environment to be aligned with the real world such that a specific orientation of the headset corresponds to a particular look direction in the virtual environment that is consistent with what the user would expect. For example, a user facing forward in a chair while viewing a virtual environment may expect to be looking forward in the virtual environment. Misalignment may cause the virtual perspective to be tilted or off-axis from the desired look direction. Small misalignments of only a few degrees may be perceptible to a user. The misalignment may be distracting or disorienting and could lead to undesirable effects, such as motion sickness.

Thus, there is a desire to be able to accurately align a virtual reality environment with a physical environment occupied by the user.

SUMMARY

The present disclosure describes a method and system for easily and consistently calibrating a virtual reality system. The system includes at least one headset that displays a video of a virtual environment. The perspective of a virtual environment is based on the position of the headset. In some embodiments, one or more mounts are used to accurately align the headset relative to a platform so that the orientation of the virtual environment can be properly aligned with the platform based on the mounted position of the headset. In some embodiments, a measured position of a platform is used to align the virtual environment with the platform.

A method is provided for operating a virtual reality system having a platform, a headset having a motion-sensing unit and a display unit configured to display a video of a virtual environment, and a mount, where the mount is positioned on the platform and the headset is releasably engageable with the mount. In one embodiment, the method includes determining a first position of the headset while the headset is engaged with the mount and associating the first position of the headset with a predetermined first perspective of a virtual environment. The method also includes determining a second position of the headset while the headset is disengaged from the mount, determining a second perspective of the virtual environment corresponding to the second position of the headset, where the second perspective is based on the difference between the first position and second position of the headset, and displaying, using the headset, a video of the virtual environment from the second perspective. The video may include rendered animated video.

In one embodiment, a virtual reality system includes a platform, a headset, a mount, and a control unit. The headset includes a motion-sensing unit and a display unit configured to display a video of a virtual environment. The mount is positioned on the platform. The mount is configured to releasably engage the headset. When the headset is engaged with the mount, the headset is in a first position. When the headset is disengaged from the mount, the headset is in a second position. The control unit is connected to the headset and is configured to receive, from the headset, first data representing the first position of the headset and associate the first position of the headset with a predetermined first perspective of a virtual environment. The control unit is also configured to receive, from the headset, second data representing the second position of the headset, determine a second perspective of the virtual environment corresponding to the second position of the headset, where the second perspective is based on the difference between the first position and second position of the headset, and provide, to the headset, video of the virtual environment from the second perspective.

In one embodiment, the mount is attached to a portion of the platform. The mount may be attached to a bench that is included in the platform.

In one embodiment, the position of the headset in the mount is oriented in a forward direction relative to the platform. In another embodiment, the position of the headset in the mount may be associated with a forward-looking perspective of the virtual environment. In yet another embodiment, the change between the first perspective and the second perspective of the virtual environment is equal to the change in the orientation of the headset between the first position and the second position.

In some embodiments, a virtual reality system includes a platform; a headset having a motion-sensing unit and a display unit configured to display a video of a virtual environment; a platform position-sensing unit configured to measure a position of the platform; and a control unit connected to the headset and the platform position-sensing unit. The control unit is configured to: receive, from the platform position-sensing unit, data representing a platform position; determine a frame of reference of a virtual environment based on the platform position; receive, from the headset, data representing a position of the headset; determine a relative headset position based on a difference between the platform position and the headset position; determine a perspective of the virtual environment in the frame of reference based on the relative headset position; and provide, to the headset, video of the virtual environment from the determined perspective. In some embodiments, the video includes rendered animated video.

In some embodiments, the platform position corresponds to a forward direction of the platform and the forward direction of the platform is associated with a forward-looking perspective of the virtual environment. In some embodiments, the difference between the forward-looking perspective of the virtual environment and the determined perspective of the virtual environment is equal to the difference between the platform position and the headset position.

In some embodiments, the platform position-sensing unit is coupled to the platform. In some embodiments, the platform includes a mount configured to engage the headset, and the platform position-sensing unit is coupled to the mount.

DESCRIPTION OF THE FIGURES

FIG. 1 depicts an exemplary embodiment of a virtual reality ride system.

FIG. 11 depicts an exemplary computing system.

Figure 2B:
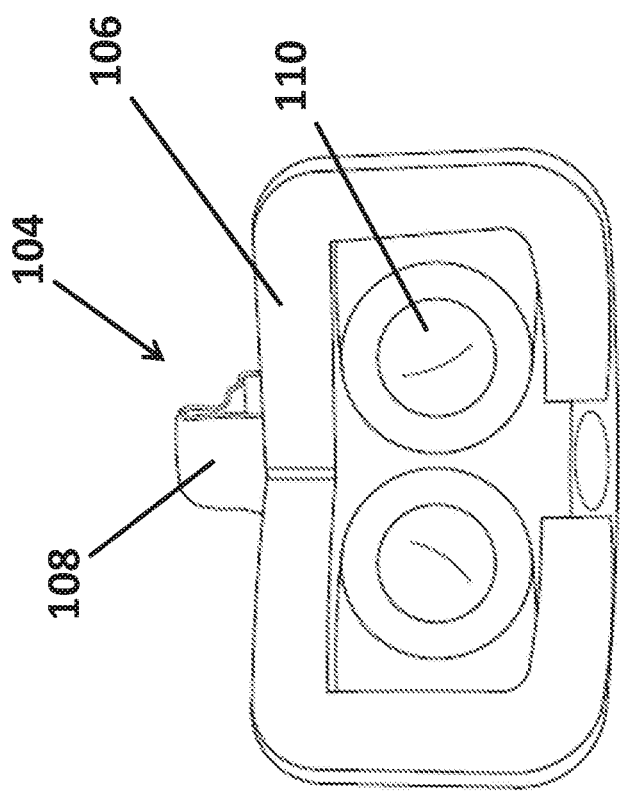
FIGS. 2A-2B depict an exemplary virtual reality headset.

The embodiments depicted in the figures are only exemplary. One skilled in the art will readily recognize from the following discussion that alternative embodiments of the structures and methods illustrated herein can be employed without departing from the principles described herein.

DETAILED DESCRIPTION

The following description sets forth specific configurations, parameters, and the like. It should be recognized, however, that such description is not intended to limit the present disclosure but is instead provided as a description of exemplary embodiments.

FIG. 1 depicts an embodiment of a virtual reality ride system 100 that includes a platform 101 and virtual reality headsets 104 that display video images of a virtual environment. Platform 101 may include physical structures associated with the virtual reality ride system 100, such as, for example, chairs, benches, mats, or the like. Platform 101 may also include a floor, walls, doors, windows, lights, or other features to create a surrounding structure associated with the virtual environment. In the embodiment depicted in FIG. 1, platform 101 includes seats 102 on which a user may sit while viewing the virtual environment through a headset 104. The seat 102 may move by vibrating, rotating, translating, or the like, to provide physical sensations associated with events occurring in the virtual environment.

Figure 2A:
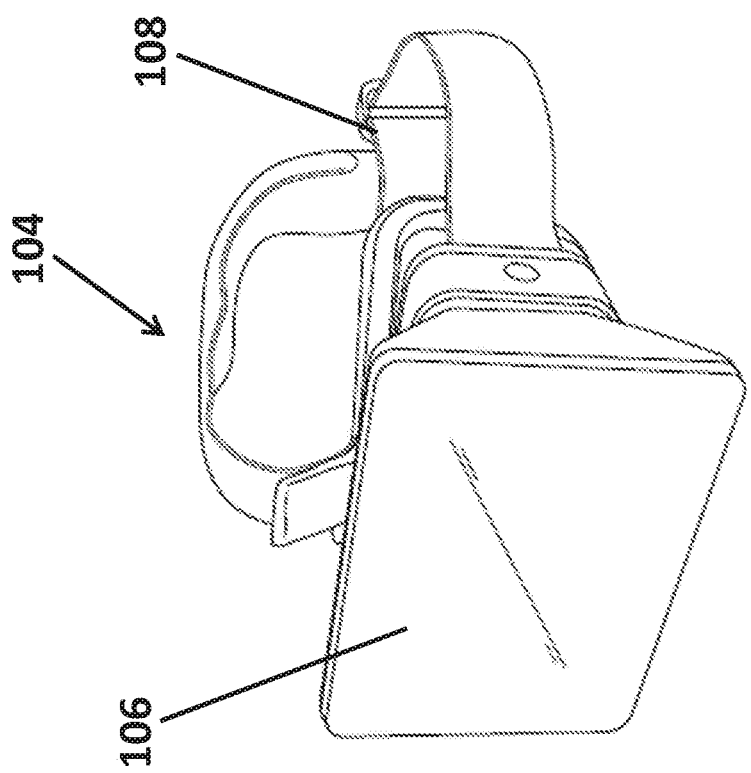

FIGS. 2A-2B depict an enlarged view of an exemplary virtual reality headset 104. Headset 104 includes a display/sensor portion 106 and straps 108 to secure headset 104 to the user's head. The display/sensor portion 106 includes a display unit that generates a two-dimensional or three-dimensional representation of the virtual environment. In some embodiments, the display unit may include a CRT, LEDs, LCDs, or the like. Optics may be used to manipulate and condition the light from the display to be presented to the user. The headset shown in FIG. 2B, for example, includes binocular optics 110 for viewing the display.

Headset 104 may also include a position-sensing and/or motion-sensing unit that detects the position of the headset. Headset 104 may include sensors (such as gyroscopes, accelerometers, or the like) to track translational movement in one, two, or three dimensions and to track rotation about one, two, or three axes. While headset 104 is worn by the user, the physical position of the user's head may be determined. For the purposes of this disclosure, position information may include location (e.g., linear position, such as the coordinates of an object along the x, y, and z axes of a rectilinear reference frame) and/or orientation (e.g., the angular position, the attitude, or the heading, elevation, and bank relative to a reference frame). Headset 104 may also include means for recalibration, such as a magnetometer to correct drift in gyroscopes used in headset 104.

It should be recognized that the techniques described herein may be applied to or used in combination with other types of headsets. As illustrated in FIGS. 2A-2B, headset 104 completely blocks the user's field of view of the surrounding environment. In some embodiments, however, the headset permits at least a partial view of the surroundings, which may allow a user to maintain some visual awareness of the surrounding environment.

As another example, the headset may be an augmented reality headset. An augmented reality headset typically provides a display without fully blocking the user's field of view. An augmented reality headset may display information, images, video, or other content that can be viewed at the same time as at least a portion of the surrounding environment. In some embodiments, an augmented reality headset includes a transparent display or one or more cameras that provide video of the surroundings. In some embodiments, the content displayed by an augmented reality headset supplements or enhances the surrounding environment. An augmented reality headset may include some or all of the features described above with respect to virtual reality headset 104 (e.g., a position-sensing and/or motion-sensing unit).

In exemplary virtual reality ride system 100, headset 104 is associated with a position in the virtual environment and displays a video image of the virtual environment from the perspective of its virtual position. The physical orientation of headset 104 may be mapped to a virtual orientation that determines the perspective of the virtual environment from the virtual location. For example, the look direction of the perspective in the virtual environment may correspond to the physical orientation of headset 104. The user may change the perspective or look direction by altering the orientation of the headset (e.g., by turning, tilting, raising, and/or lowering his/her head). When a user tilts his/her head back, for example, headset 104 may display an image of the virtual environment above the virtual location associated with headset 104. Thus, the user may "look around" the virtual environment simply by moving his/her head the same way he/she would look around the physical environment, without the need for a separate controller or input device.

In addition, the virtual location associated with headset 104 may be based on the physical location of headset 104. In some embodiments, headset 104 includes sensors to detect and track translational movement, allowing the user to change the virtual location associated with headset 104 by leaning or moving around platform 101, thereby changing the origin of the virtual perspective.

In some embodiments, the virtual environment may be aligned with platform 101 such that a particular physical position (e.g., location and orientation) with respect to platform 101 corresponds to a predetermined perspective of the virtual environment. The alignment may ensure that the perspective of the virtual environment displayed to the user is consistent with what the user would intuitively expect to see based on his/her physical position.

For example, in exemplary virtual reality ride system 100 depicted in FIG. 1, the direction parallel to the floor of platform 101 and perpendicular to the back cushion of seat 102 may correspond to the forward direction in the virtual environment, or more precisely, to the direction in the virtual environment that represents the forward direction relative to the virtual location associated with headset 104. Thus, a user sitting upright in the seat 102 with his/her head oriented forward would be shown an upright perspective looking straight ahead in the forward direction of the virtual environment. Furthermore, when the virtual location associated with headset 104 is moved forward, the user would perceive that he/she too is moving forward.

Figure 3A:
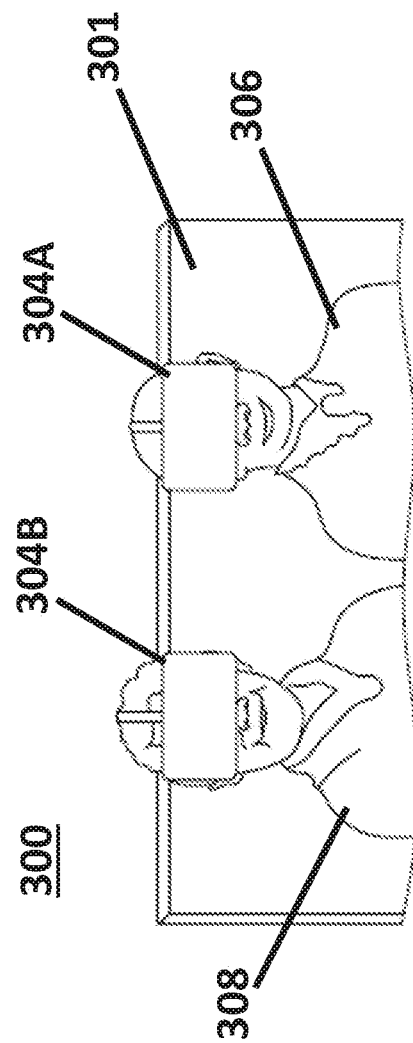
FIG. 3A depicts two users in a first position using the virtual reality ride system.
Figure 3C:
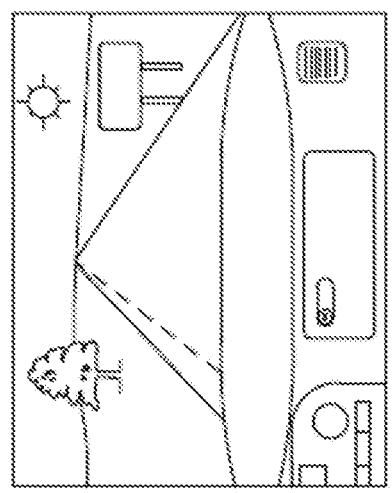
FIG. 3C depicts a second exemplary perspective of the virtual environment.
Figure 3B:
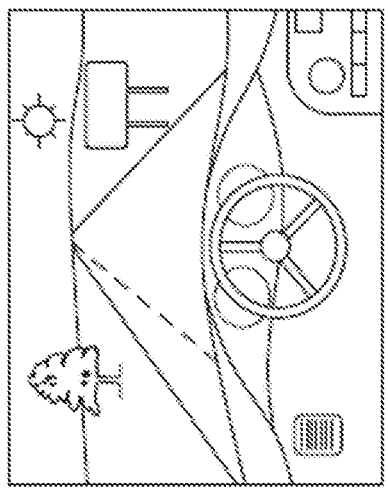
FIG. 3B depicts a first exemplary perspective of a virtual environment.

FIGS. 3A-3E depict an exemplary virtual reality system 300 in which the virtual environment is aligned with a physical platform 301. FIG. 3A depicts a front view of two users 306 and 308 next to each other facing forward relative to a platform 301. FIG. 3B depicts an exemplary view of the virtual environment displayed to user 306 by headset 304A. The location of user 306 in the virtual environment (i.e., the virtual location associated with headset 304A worn by user 306) is determined by the physical position of the headset worn by user 306. Since user 306 is on the left side of the platform 301 (from the perspective of the users) and facing forward, headset 304A displays a first-person perspective of the virtual environment from the driver's seat of the car (according to U.S. convention) looking out the front windshield of the car.

FIG. 3C depicts an exemplary view of the virtual environment displayed to user 308 by headset 304B. User 308 is physically located on the right side of the platform 301, and therefore headset 304B displays a perspective from the front passenger seat of the car. Since user 308 is also facing forward, headset 304B displays a view looking out through the front windshield.

Figure 3D:
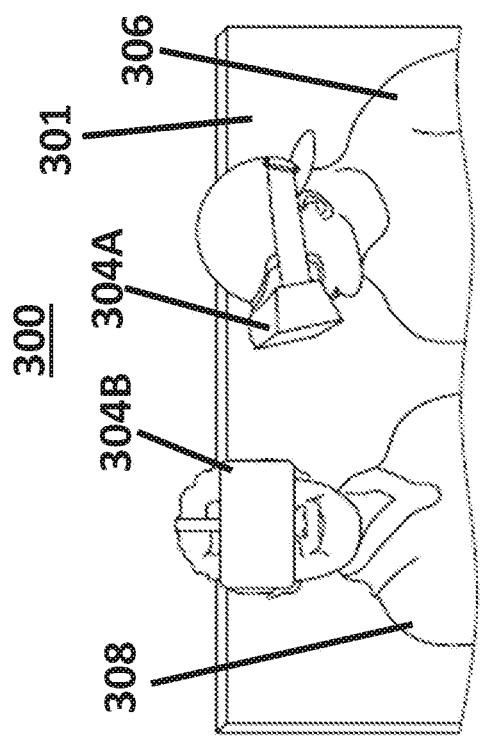
FIG. 3D depicts two users in a second position using the virtual reality ride system.
Figure 3E:
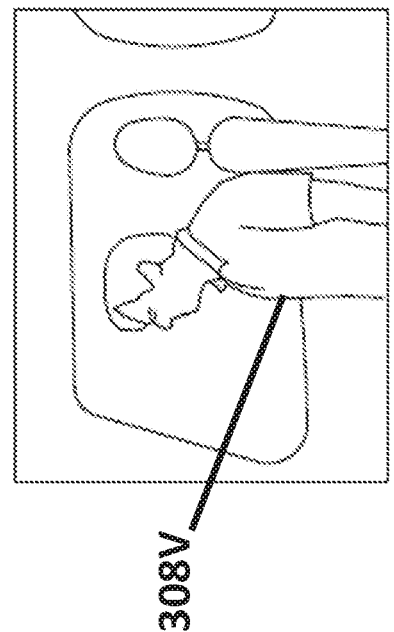
FIG. 3E depicts a third exemplary perspective of the virtual environment.

FIG. 3D depicts user 306 with headset 304A turned toward user 308. In this position, user 306 is shown a perspective from the driver's seat looking toward the passenger seat, and sees a virtual representation 308V of user 308, as shown for example in FIG. 3E.

Accordingly, FIGS. 3A-3E illustrate that the users' locations and perspectives in the virtual environment correspond to the physical locations and orientations of headsets 304A and 304B in the physical environment.

However, if the virtual environment displayed to a user is not aligned with the platform 301 as described above, the user's view of the virtual environment may be inconsistent with what the user would expect based on his/her physical position. For example, misalignment may cause the perspective to be tilted or off-axis from the virtual forward direction, even though the user is upright and facing forward in relation to the platform 301. Furthermore, if there is nothing in the virtual environment that indicates which direction is forward (e.g., the interior of the car depicted in FIGS. 3B-3C and 3E), motion in the virtual environment may be misperceived (e.g., forward movement in the virtual environment may appear to be sideways motion or include a sideways component).

Even small misalignments of a few degrees may be perceptible to a user. Inconsistency between the virtual perspective displayed to the user and the perspective that the user expects to see based on his/her physical position may be distracting or disorienting and could lead to undesirable effects, such as motion sickness.

To reduce misalignment between the virtual and physical environments, the system may be calibrated when the headset is in a known position relative to the platform. In some embodiments, the position of the headset is determined and associated with a predetermined virtual perspective. The predetermined virtual perspective defines the frame of reference or orientation of the virtual environment with respect to the physical environment. The alignment between the virtual environment and the physical platform is therefore defined by the position of the headset at the time of calibration.

Accordingly, the accuracy of the alignment between the platform and the virtual environment depends on how accurately the headset is aligned with the platform at the time of calibration. An alignment mount may be used to accurately and precisely align the headset with the platform. The mount may be attached to the platform such that it is aligned with and fixed in a known position relative to the platform.

Figures 4A, 4B:
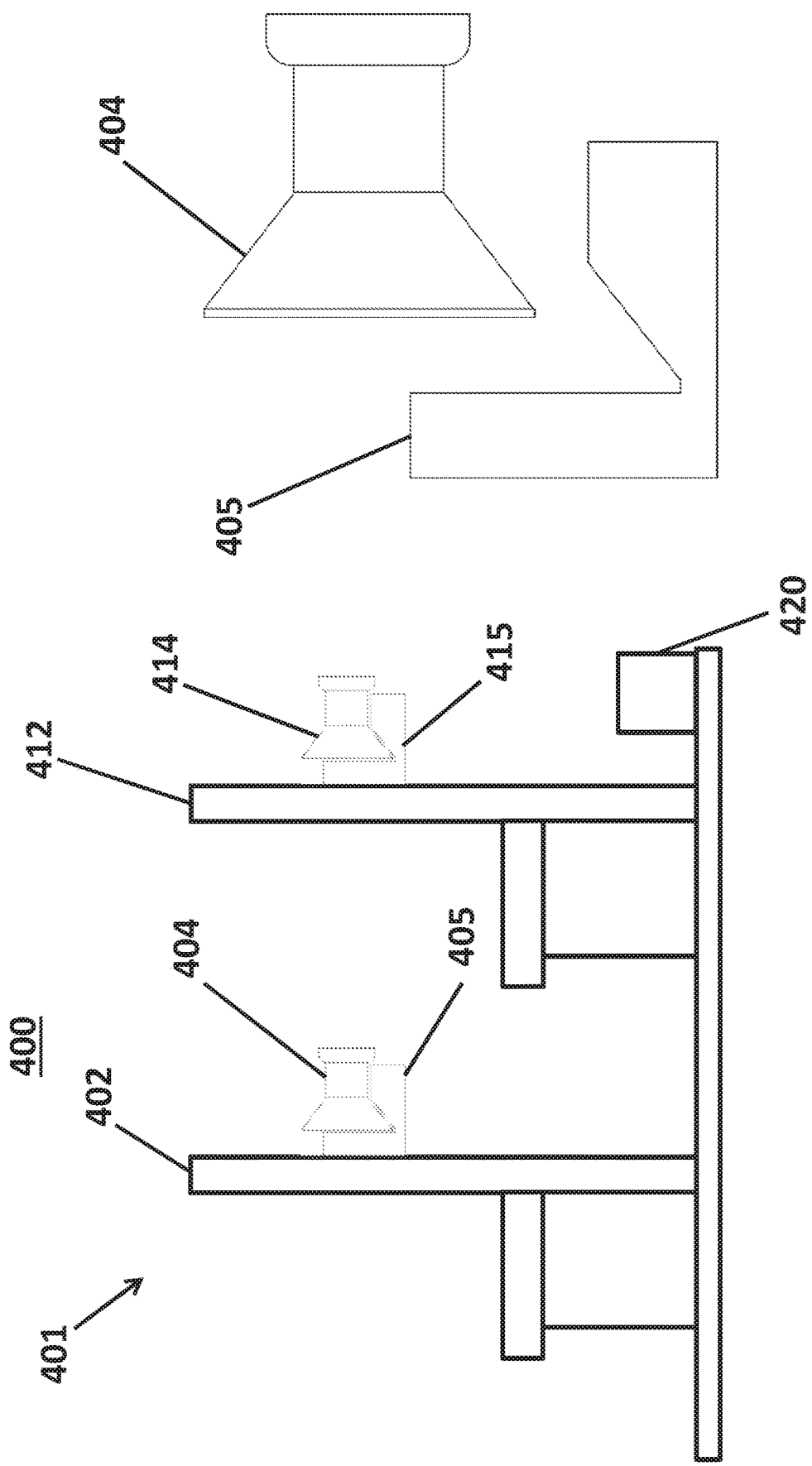
FIG. 4A depicts an exemplary virtual reality ride system with headset alignment mounts.
FIG. 4B depicts the headset and alignment mount shown in FIG. 4A.

FIG. 4A depicts an embodiment of a virtual reality system 400 with exemplary headset alignment mounts. System 400 includes platform 401, headsets 404, 414, and mounts 405, 415. Mounts 405, 415 are placed in known positions relative to platform 401. In FIG. 4A, mounts 405, 415 are positioned on platform 401. Mounts 405, 415 may be fixedly or releasably attached to platform 401. In FIG. 4A, mounts 405, 415 are attached to the backs of benches 402, 412. It should be recognized, however, that there are various places in which mounts 405, 415 may be placed—including, for example, underneath a seat or bench, on the headrest of a seat or bench, or on a pole, stand, rack, or the like. It should also be recognized that a mount does not necessarily need to be attached to a platform. In some embodiments, a mount is in a known, but remote, position relative to a platform.

FIG. 4A also shows headsets 404, 414 engaged with mounts 405, 415. Headsets 404, 414 are releasably engageable with mounts 405, 415 so that users sitting on benches 402, 412, for example, may use headsets 404, 414 located in front of them. For example, a user sitting on bench 412 may use headset 404 by disengaging it from mount 405.

FIG. 4B shows an enlarged view of headset 404 and mount 405 with headset 404 disengaged from mount 405.

Mount 405 and headset 404 are configured to be complementary, such that headset 404 is in a known position relative to mount 405 when engaged with the mount 405. Mount 405 conforms to the size and shape of headset 404 so that the position of headset 404 is limited when it is properly engaged with mount 405, but headset 404 can still be easily engaged and disengaged. In some embodiments, a mount may not support or be configured not to engage a headset unless it is properly positioned. In such cases, engagement of the headset with the mount indicates that the headset is in the correct position.

Thus, when properly engaged with mount 405, the position of headset 404 relative to mount 405 is known precisely. Furthermore, since the position of mount 405 is known relative to platform 401, the position of headset 404 relative to platform 401 is also known.

Figure 5:
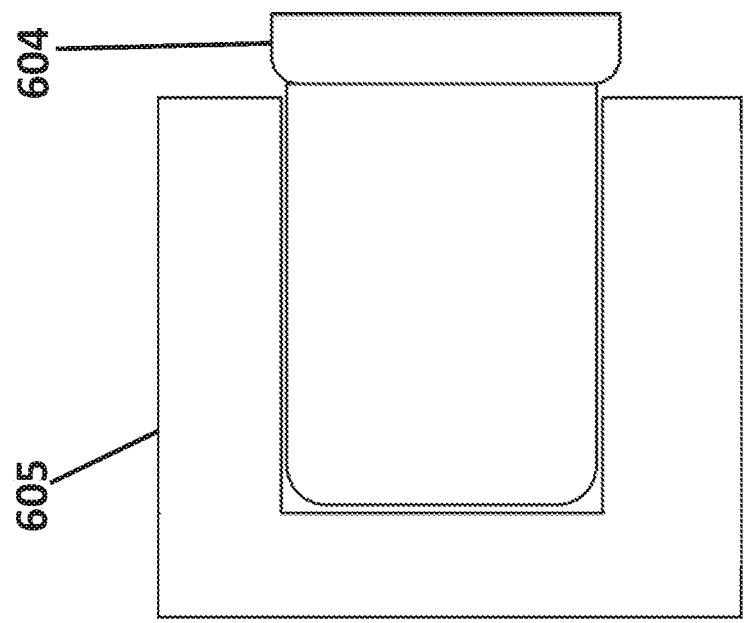
FIG. 5 depicts another exemplary headset alignment mount for the headset shown in FIGS. 4A-4B.
Figure 6:
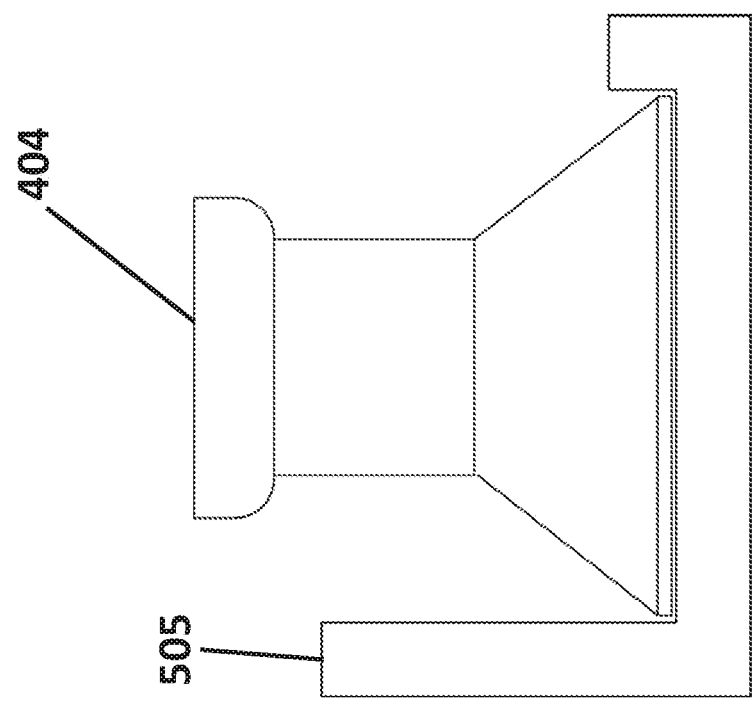
FIG. 6 depicts another exemplary headset and alignment mount.

It should be recognized that various mount geometries may be possible for a particular headset. For example, FIG. 5 depicts another exemplary embodiment of a mount 505 that may be used with headset 404. The geometry of the mount may also vary based on the size and shape of the headset. FIG. 6 depicts yet another exemplary embodiment of a mount 605 that conforms to the geometry of a headset 604, which has a different shape than headset 404. Depending on the geometry of the mount and the headset, there are various ways in which the headset may be configured to engage the mount, including being placed on, connected to, hung from, or inserted into the mount. Also, in some embodiments, the mount includes hooks, clips, pegs, or other means for releasably engaging the headset. In some embodiments, the headset includes hooks, clips, pegs, or other means for releasably engaging the mount.

In some embodiments, a mount is configured to engage more than one headset. For example, a mount may include a rack, stand, or other structure configured to engage multiple headsets for calibration. For example, in the example depicted in FIG. 4A, instead of mounts 405 and 415, system 400 may include a rack configured to hold headsets 404, 414, which is positioned on or near the side of platform 401 so that users can grab headsets 404, 414 upon entering platform 401.

Figure 7:
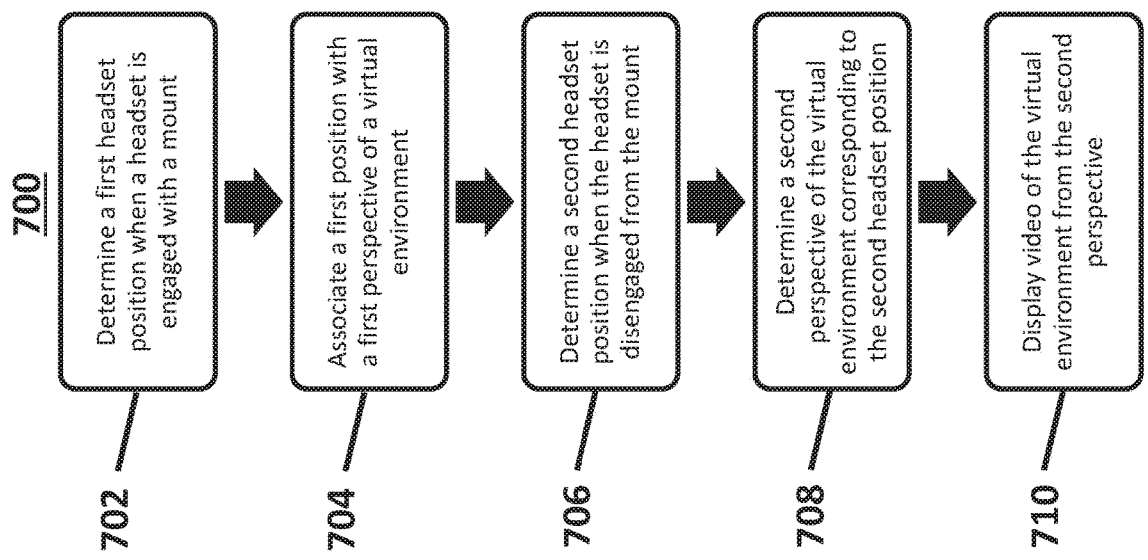
FIG. 7 depicts an exemplary process for calibrating and operating a virtual reality system.

FIG. 7 depicts a flow chart illustrating an exemplary process 700 for calibrating and operating a virtual reality system using a mount. The system includes a mount positioned on a platform and a headset that is releasably engageable to the mount.

In step 702, a first position of the headset is determined when the headset is engaged with the mount. The first position of the headset may be determined based on measurements of the location and/or orientation of the headset. The measurements may be obtained by position or motion sensors provided in the headset.

In step 704, the first position of the headset is associated with a first perspective of a virtual environment. Associating the first position with the first perspective sets the frame of reference of the virtual environment. In some embodiments, the first position (i.e., the position of the headset in the mount) is oriented to match a known state (e.g., a known frame of reference or orientation) in the virtual environment. For example, the first perspective may be predetermined so that the position of the headset in the mount corresponds to a perspective that establishes a frame of reference for the virtual environment that aligns with the platform. The headset may send data representing the first position to processors included in the virtual reality system to be associated with the first perspective of the virtual environment.

The desired alignment between the platform and the virtual environment may be determined in advance of operating the system. The first perspective depends on the position of the headset in the mount and is chosen such that the headset will display a perspective that is intuitively consistent with the position of the headset relative to the platform. The mounts allow the headsets to be accurately aligned with the platform so the first virtual perspective can be associated with the proper physical position. By knowing the position of the headset relative to the platform, the virtual environment may be aligned with the platform by associating the position of the headset with the virtual perspective that results in the desired alignment. The greater the accuracy with which the mount and headset are aligned to the platform, the better the alignment of the virtual environment will be.

It should be recognized that, for the purposes of calibration, the particular position of the headset while in the mount is unimportant, provided the position is known and the system associates the mounted position with the proper virtual perspective. In the embodiment depicted in FIG. 4A, the position of headset 404 in mount 405 is oriented in a forward direction relative to platform 401. However, in FIG. 5, exemplary mount 505 is configured such that the front of headset 404 is oriented in a downward direction when placed in mount 505. In this case, the orientation of headset 404 at the time of calibration would be mapped to a perspective of the virtual environment looking directly down. FIG. 5 also illustrates that it may be possible to achieve the mount characteristics discussed above with different mount configurations.

In step 706, a second physical position of the headset is determined when the headset is disengaged from the mount. In one embodiment, the headset is disengaged from the mount and positioned on a user's head to view images of the virtual environment. As discussed above, the position of the headset may be determined by sensors included in the headset that detect the motion of the headset.

In step 708, a second perspective of the virtual environment corresponding to the second headset position is determined. The second perspective may be determined based on the second position of the headset determined in step 706. For example, second perspective may be based on the difference between the first position and the second position of the headset. In one embodiment, the change in orientation or look direction from the first virtual perspective to the second virtual perspective is based on the change in orientation of the headset from the engaged position to the disengaged position. For example, the look direction in the virtual environment may be moved from the look direction of the predetermined perspective by the same amount and in the same direction as the orientation of the headset from its mounted position to its updated position.

In step 710, video showing the virtual environment from the second perspective determined in step 708 is displayed by the headset. In one embodiment, the video includes animated images rendered based on the determined perspective of the virtual environment and thus the position of the headset.

Returning to FIG. 4A, techniques for aligning a virtual reality system using a measured position of a platform will now be described. System 400 includes a platform position-sensing unit 420 that detects the position and/or motion of platform 401. Platform position-sensing unit 420 may include sensors (such as gyroscopes, accelerometers, or the like) to track translational movement of platform 401 in one, two, or three dimensions and/or to track rotation of platform 401 about one, two, or three axes. System 400 may also include means for recalibration of the sensors, such as a magnetometer to correct drift in gyroscopes used in platform position-sensing unit 420. In some embodiments, the sensor is located in, or attached to, platform 401. For example, the sensor may be located in bench 402 or 412, mount 405 or 415, or elsewhere on or in platform 401. In some embodiments, there is one or more platform position-sensing unit. In some embodiments, each mount includes a separate platform position-sensing unit.

The measured position of a platform can be used to keep the virtual environment aligned with the platform. This may be advantageous for systems in which the orientation of the virtual environment is to remain fixed relative to the platform but the platform is likely to move, such as in a plane, car, or other vehicle. For example, even if a headset remains stationary relative to a platform, rotation of the platform itself can cause the headset to rotate, which changes the view of the virtual environment. Thus, movement of the platform alters the displayed view just as if the user has turned his/her head, even if the user has not done so. Thought of another way, platform motion can cause the orientation of the virtual environment to drift and become misaligned with the platform (e.g., the forward direction of the platform no longer aligns with the forward-looking direction in the virtual environment). This effect may be undesirable, particularly for applications in which the view of the virtual environment is to be controlled solely by the user or should remain aligned with the platform. For example, an airline passenger viewing a movie in virtual reality would likely prefer that the view of the movie remain aligned with his/her seat rather than changing as the plane turns.

In some embodiments, a position of the platform is used to maintain alignment between the virtual environment and the platform. For example, platform position-sensing unit 420 can measure the position of platform 401 and determine a relative forward direction based on the direction in which platform 401 is facing. System 400 can then be calibrated by setting the frame of reference of the virtual environment to align with the relative forward direction. Once calibrated, the views displayed by headsets 404, 414 are based on their positions relative to the forward direction. Accordingly, instead of calibrating a system based on a known position of a headset in a mount as described above, the system is calibrated based on the measured position of the platform.

In some embodiments, the system is re-calibrated periodically (e.g., every second). Optionally, the frequency of re-calibration depends on an expected motion of the platform (e.g., a system with a platform that is expected to move or turn more quickly is re-calibrated more frequently). In some embodiments, the frequency of re-calibration depends on the measured motion of a platform (e.g., re-calibration is performed more frequently when rapid changes in platform position are detected to reduce the amount of drift).

Figure 8:
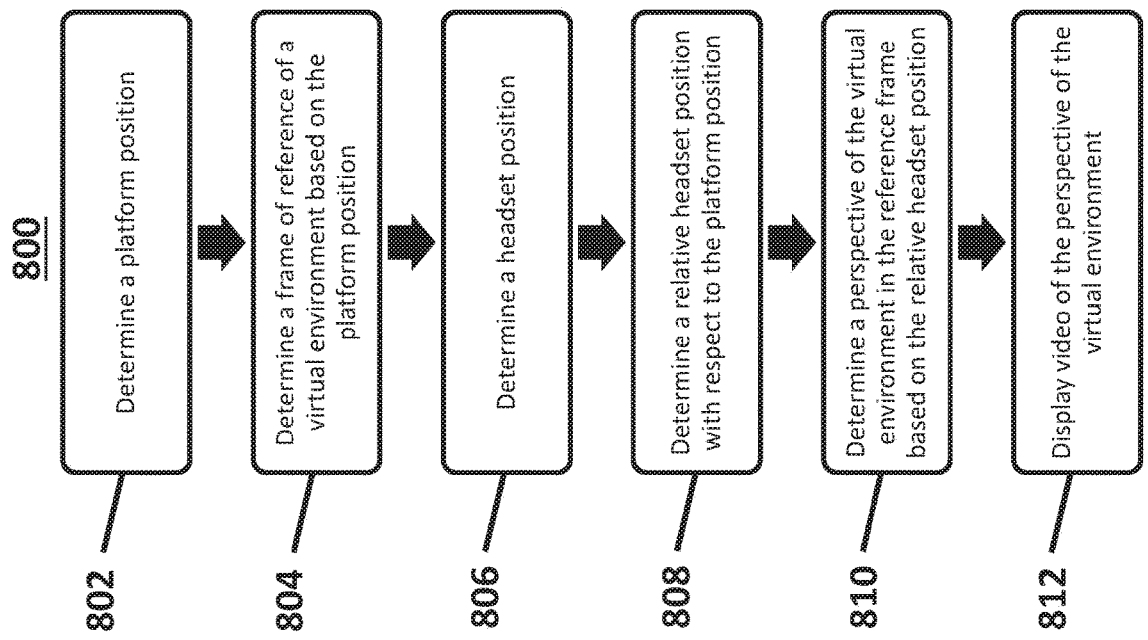
FIG. 8 depicts another exemplary process for calibrating and operating a virtual reality system.

FIG. 8 depicts a flow chart illustrating an exemplary process 800 for calibrating and operating a virtual reality system using a measured position of a platform. The system may be, for example, system 400 described above or system 800 or 900 described below.

In step 802, a position of a platform is determined. The position may be based on a measurement by a platform position-sensing unit such as described above. In step 804, a frame of reference of a virtual environment is determined based on the platform position. For example, the frame of reference may be oriented such that a predetermined virtual direction (e.g., a forward-looking direction) is aligned with a forward-facing direction of the platform. In step 806, a position of the headset is determined. The position of the headset may be measured as described above with respect to step 702 in process 700. In step 808, a relative headset position is determined with respect to the platform position. For example, the relative headset position may be the difference between the measured headset position and the position of the platform. In step 810, a perspective of the virtual environment in the reference frame is determined based on the relative headset position. For example, the perspective may deviate from the forward-looking direction in the virtual environment by the same amount that the headset position deviates from the platform position. In step 812, a video of the perspective of the virtual environment is displayed.

It should be recognized that some features of processes 700 and 800 may be combined, the order of some features may be changed, and some features may be omitted. It should also be recognized that processes 700 and 800 may be applied to systems configured for one or more users. Also, the virtual reality systems and processes described above are not limited to any particular virtual environment. For example, a virtual reality experience may include a walk through a city, a ride on Santa's sleigh to the North Pole, flying on the back of an imaginary creature through the sky, driving a jeep through a safari, or other real or imaginary virtual experiences.

The alignment and calibration techniques described herein may be applied to other types of virtual reality systems besides rides, including interactive systems such as video games, simulators (e.g., flight and vehicle simulators), or the like. These systems may not include a dedicated platform or bench, such as those described above. For example, a headset alignment mount may be attached to a personal desk, chair, monitor, or other object to align a headset used with a gaming console, personal computer, or the like. In which case, the object serves as the platform to which the virtual environment is aligned.

Figure 9:
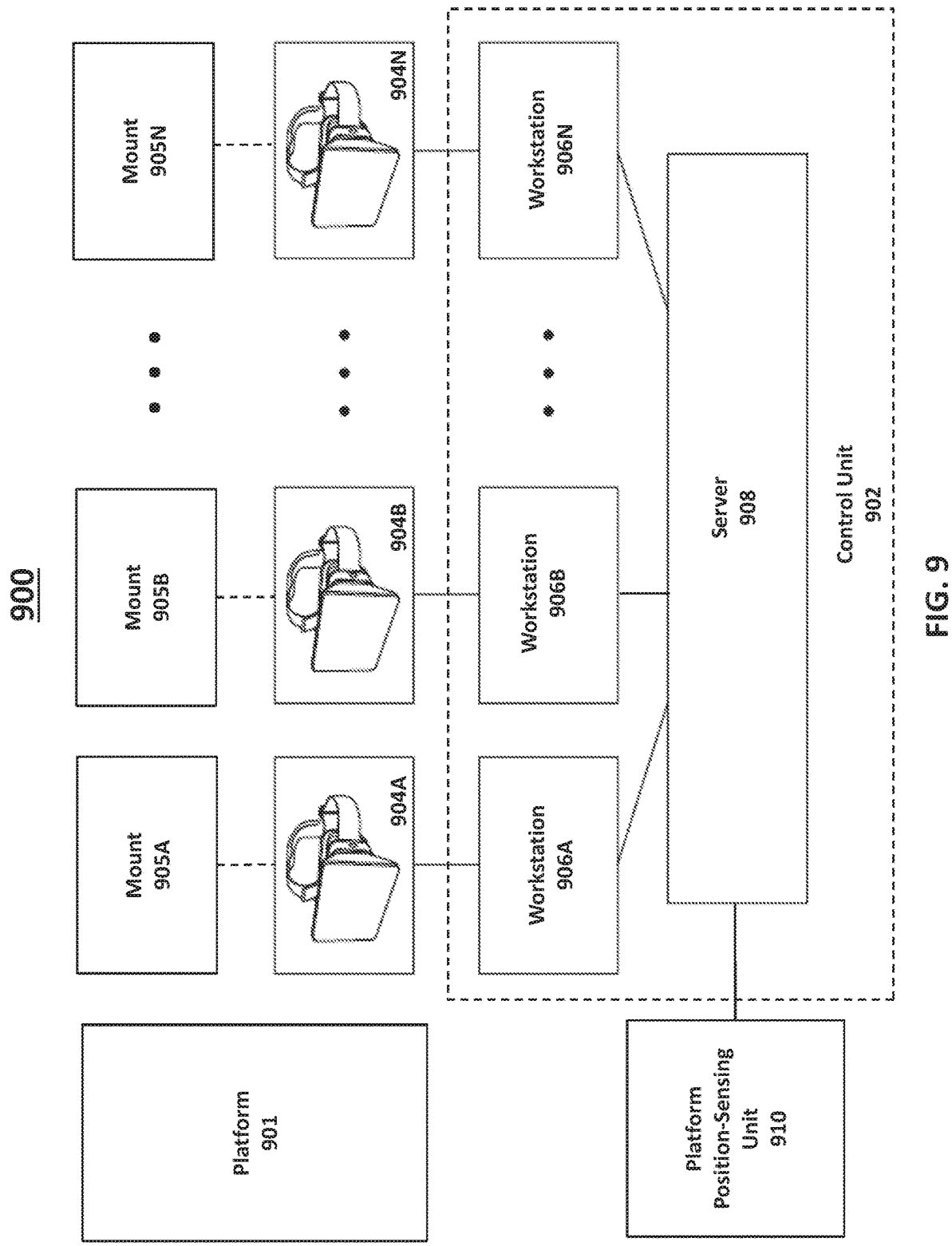
FIG. 9 depicts a block diagram of an embodiment of a virtual reality system.

Turning now to FIG. 9, an exemplary architecture of a virtual reality system 900 is described. Virtual reality system 900 may be used to implement some or all of the operations of processes 700 and 800 described above. FIG. 9 depicts a block diagram of an embodiment of virtual reality system 900, which includes platform 901, control unit 902, headsets 904, mounts 905, and platform position-sensing unit 910. Control unit 902 includes workstations 906 and server 908. Each headset 904 is releasably connectable to a mount 905 (as indicated by the dashed connecting lines) and is connected to a workstation 906. Each workstation 906 is connected to server 908, which networks together workstations 906 and platform position-sensing unit 910. Workstations 906 and/or server 908 may be remote from platform 901 or integrated with platform 901, for example, beneath a seat or in a cabinet.

In one embodiment, headsets 904 communicate data representing the physical location and orientation of headsets 904 to workstations 906, which may pass the data to the server 908. Workstations 906 may include one or more processors for rendering animated video or content of a virtual environment. Each workstation 906 renders a view of the virtual environment based on the virtual position associated with its corresponding headset 904 (which is based on the physical position of headset 904), and provides the video to its corresponding headset 904. Server 908 may also include one or more processors to coordinate the workstations 906 and provide data for rendering. The data may include elements or events in the virtual environment such as, for example, scenery, characters, objects, character motion, or the like.

Figure 10:
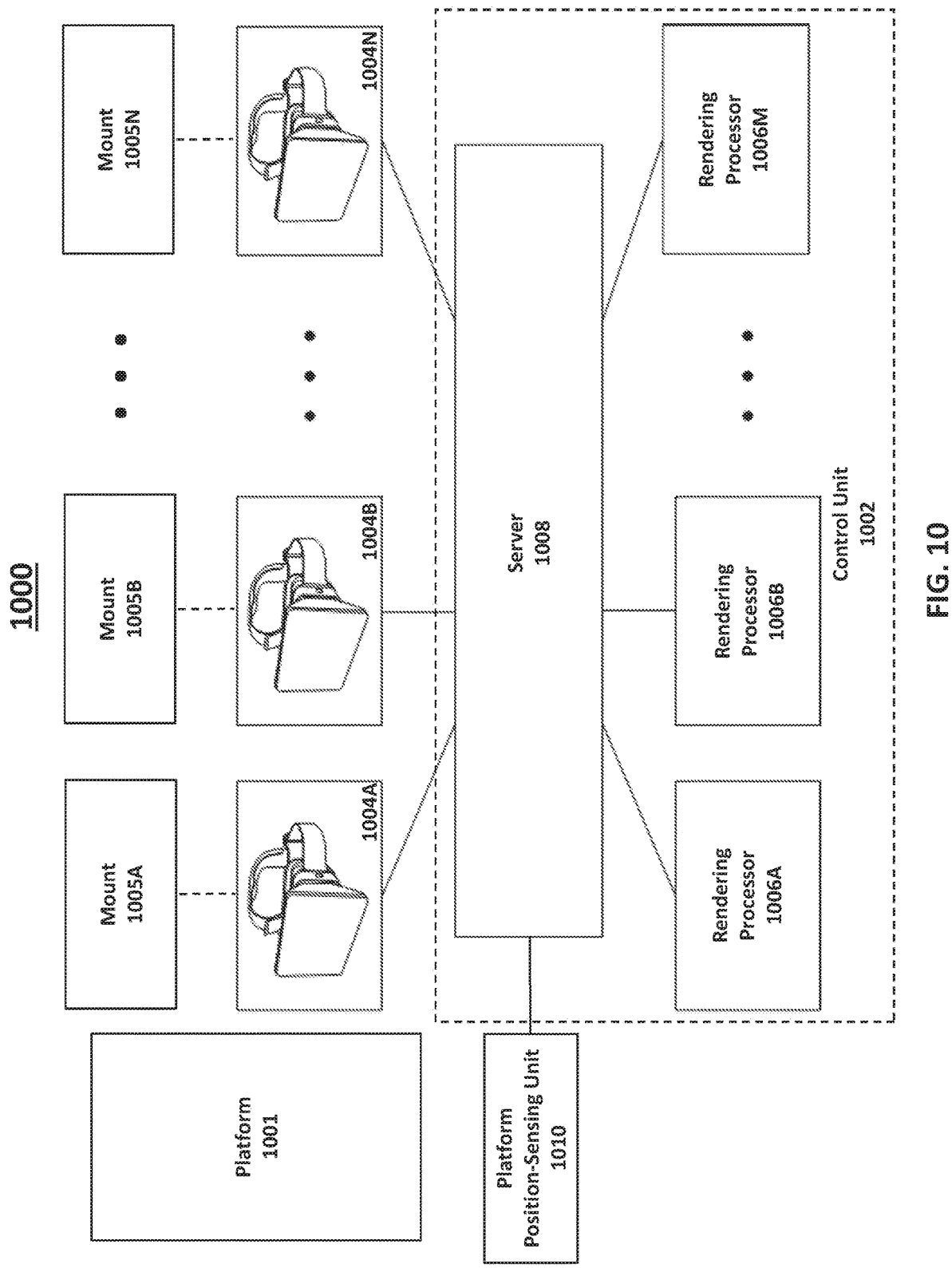
FIG. 10 depicts a block diagram of another embodiment of a virtual reality system.

In an alternative embodiment depicted in FIG. 10, virtual reality system 1000 includes a control unit 1002 having rendering processors 1006 and a server 1008 similar to system 900, but headsets 1004 are connected directly to the server 1008 rather than rendering processors 1006. Server 1008 may distribute animation video rendering processing among rendering processors 1006, and then provide the rendered video to the appropriate headset. Notably, the number M of rendering processors 1006 does not necessarily equal the number N of headsets 1004.

Although not shown, various alternative configurations are possible for receiving communications from the platform position-sensing unit. In some embodiments, the platform position-sensing unit communicates via a wired or wireless communication link. In some embodiments, the platform position-sensing unit communicates directly with one or more headsets or one or more workstations or rendering processors.

It should be recognized that some or all of the techniques described above for virtual reality systems can be applied in an analogous manner to an augmented reality system. An augmented reality system may display content based on the position of an augmented reality headset. For example, instead of, or in addition to, a virtual environment, a system may display information or other content associated with the surrounding environment. Furthermore, the system may determine the content to be displayed based on the position of the headset in a manner analogous to the way in which the virtual reality systems described above determine the perspective of the virtual environment to be displayed. If the content to be displayed by the augmented reality system depends on the position of the headset, it may therefore be advantageous to calibrate the headset according to one or more of the techniques described above.

FIG. 11 depicts components of an exemplary computing system 1100 configured to perform any one of the above-described processes. In some embodiments, the workstations, rendering processors, and/or servers described above may include some or all of the elements of computing system 1100. Computing system 1100 may include, for example, a processor, memory, storage, and input/output devices (e.g., monitor, keyboard, stylus, drawing device, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes in software, hardware, or some combination thereof.

In computing system 1100, the main system 1102 may include a motherboard 1104 with a bus that connects an input/output ("I/O") section 1106, one or more central processing unit ("CPU") 1108, and a memory section 1110, which may have a flash memory card 1112 related to it. Memory section 1110 may contain computer-executable instructions and/or data for carrying out at least portions of processes 700 and 800. The I/O section 1106 may be connected to display 1124, a keyboard 1114, a disk storage unit 1116, and a media drive unit 1118. The media drive unit 1118 can read/write a non-transitory, computer-readable storage medium 1120, which can contain programs 1122 and/or data.

At least some values based on the results of the above-described processes can be saved for subsequent use. Additionally, a non-transitory, computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

We claim:

1. A virtual reality system for an amusement park ride, comprising:
a headset having a headset sensor unit and a display, wherein the headset sensor unit is integral with a structure of the headset;
a platform sensor unit associated with a platform of the amusement park ride; and
one or more processors connected to the headset and the platform sensor unit, the one or more processors configured to:
calibrate a perspective of a virtual environment displayable in a video on the display of the headset, wherein calibrating the perspective comprises:
receiving, from the platform sensor unit, platform data representing characteristics indicative of a platform position;
receiving, from the headset sensor unit, headset data representing characteristics indicative of a headset position;
determining, based on the platform data and the headset data, the perspective of the virtual environment; and
displaying, on the display of the headset, the video with the perspective of the virtual environment; and
determine a changed perspective of the virtual environment, wherein determining the changed perspective comprises:
receiving, from the headset unit, additional headset data representing characteristics indicative of an additional headset position;
determining, without additional feedback from the platform sensor unit and based on the perspective and the additional headset data, the changed perspective of the virtual environment; and
displaying, on the display of the headset, the video with the changed perspective of the virtual environment.

2. The virtual reality system of claim 1, wherein the headset sensor unit comprises a gyroscope, an accelerometer, a magnetometer, or any combination thereof.

3. The virtual reality system of claim 1, wherein the headset sensor unit is configured to capture, in the additional headset data representing the characteristics indicative of the additional headset position, movement of the platform and movement of the headset independent from the movement of the platform.

4. The virtual reality system of claim 1, wherein the one or more processors is configured to calibrate a re-calibration perspective of the virtual environment displayable in the video on the display of the headset, wherein calibrating the re-calibration perspective comprises:
- receiving, from the platform sensor unit, re-calibration platform data representing characteristics indicative of a re-calibration platform position;
- receiving, from the headset sensor unit, re-calibration headset data representing characteristics indicative of a re-calibration headset position;
- determining, based on the re-calibration platform data and the re-calibration headset data, the re-calibration perspective of the virtual environment; and
- displaying, on the display of the headset, the video with the re-calibration perspective of the virtual environment.

5. The virtual reality system of claim 4, wherein a duration between calibrating the perspective and calibrating the re-calibration perspective is dependent on expected movement of the platform.

6. The virtual reality system of claim 5, wherein the duration is calculated by the one or more processors.

7. The virtual reality system of claim 1, wherein determining, based on the platform data and the headset data, the perspective of the virtual environment comprises:
- determining a frame of reference of the virtual environment based on the platform data;
- determining a relative headset position based on a difference between the platform position and the headset position; and
- determining the perspective of the virtual environment within the frame of reference based on the relative headset position.

8. The virtual reality system of claim 1, wherein the video provided by the one or more processors to the display of the headset comprises augmented reality content.

9. A method of operating a virtual reality system for an amusement park ride, comprising:
- calibrating a perspective of a virtual environment displayable in a video and on a display of a headset of the virtual reality system, wherein calibrating the perspective comprises:
  - receiving, at one or more processors of the virtual reality system and from a platform sensor unit of the virtual reality system, platform data representing characteristics indicative of a platform position of a moving platform of the amusement park ride;
  - receiving, at the one or more processors and from a headset sensor unit of the virtual reality system, headset data representing characteristics indicative of a headset position of the headset; and
  - determining, via the one or more processors and based on the platform data and the headset data, the perspective of the virtual environment; and
- determining a changed perspective of the virtual environment, wherein determining the changed perspective comprises:
  - receiving, at the one or more processors and from the headset sensor unit, additional headset data representing characteristics indicative of an additional headset position; and
  - determining, without additional feedback from the platform sensor unit and based on the perspective and the additional headset data, the changed perspective of the virtual environment.

10. The method of claim 9, comprising:
displaying, on the display of the headset, the video with the perspective of the virtual environment; and then
displaying, on the display of the headset, the video with the changed perspective of the virtual environment.

11. The method of claim 9, wherein the headset sensor unit captures, in the additional headset data representing the characteristics indicative of the additional headset position, movement of the moving platform and movement of the headset independent from the movement of the moving platform.

12. The method of claim 9, comprising calibrating a re-calibration perspective of the virtual environment displayable in the video on the display of the headset, wherein calibrating the re-calibration perspective comprises:
- receiving, from the platform sensor unit, re-calibration platform data representing characteristics indicative of a re-calibration platform position;
- receiving, from the headset sensor unit, re-calibration headset data representing characteristics indicative of a re-calibration headset position; and
- determining, based on the re-calibration platform data and the re-calibration headset data, the re-calibration perspective of the virtual environment.

13. The method of claim 12, comprising:
displaying, on the display of the headset, the video with the perspective of the virtual environment; and then
displaying, on the display of the headset, the video with the changed perspective of the virtual environment; and then
displaying, on the display of the headset, the video with the re-calibration perspective of the virtual environment.

14. The method of claim 12, wherein a duration between calibrating the perspective and calibrating the re-calibration perspective is dependent on expected movement characteristics of the moving platform.

15. The method of claim 14, comprising calculating the duration.

16. The method of claim 9, comprising including augmented reality content in the video.

17. The method of claim 9, wherein the additional headset data includes gyroscope data, accelerometer data, magnetometer data, or a combination thereof.

18. A non-transitory computer-readable storage medium comprising computer-executable instructions for operating a virtual reality system of an amusement park ride, the computer-executable instructions comprising instructions for:
- calibrating, at a plurality of instances during a single run of the amusement park ride, a perspective of a virtual environment displayable in a video and on a display of a headset of the virtual reality system, wherein each calibration comprises:
  - receiving, from a platform sensor unit, platform data representing characteristics indicative of a platform position of a moving platform of the amusement park ride;
  - receiving, from a headset sensor unit, headset data representing characteristics indicative of a headset position of the headset;
  - determining, based on the platform data and the headset data, the perspective of the virtual environment; and
  - displaying, on the display of the headset, the video with the perspective of the virtual environment; and
- determining a changed perspective of the virtual environment between a first instance of calibrating the perspective and a second instance of calibrating the perspective, wherein determining the changed perspective comprises:

receiving, from the headset sensor unit, additional headset data representing characteristics indicative of an additional headset position;

determining, without additional feedback from the platform sensor unit and based on the perspective and the additional headset data, the changed perspective of the virtual environment; and displaying, on the display of the headset, the video with the changed perspective of the virtual environment.

19. The computer-readable storage medium of claim 18, wherein a duration of time between the first instance of calibrating the perspective and the second instance of calibrating the perspective is based on expected movement of the moving platform.

20. The computer-readable storage medium of claim 18, wherein determining, based on the platform data and the headset data, the perspective of the virtual environment comprises:

determining a frame of reference of the virtual environment based on the platform data;

determining a relative headset position based on a difference between the platform position and the headset position; and determining the perspective of the virtual environment within the frame of reference based on the relative headset position.

21. The computer-readable storage medium of claim 18, the computer-executable instructions comprising instructions for including augmented reality content in the video.

* * * * *